(12) United States Patent
Chang et al.

(10) Patent No.: US 7,688,355 B2
(45) Date of Patent: Mar. 30, 2010

(54) SYSTEM AND METHOD FOR STORING IMAGES OF A WORKPIECE

(75) Inventors: Chih-Kuang Chang, Taipei Hsien (TW); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 293 days.

(21) Appl. No.: 11/782,655

(22) Filed: Jul. 25, 2007

(65) Prior Publication Data

US 2008/0136917 A1 Jun. 12, 2008

(30) Foreign Application Priority Data

Dec. 8, 2006 (CN) .......................... 2006 1 0157379

(51) Int. Cl.
*H04N 5/232* (2006.01)
*H04N 1/387* (2006.01)
(52) U.S. Cl. ............................. 348/218.1; 348/207.11; 358/450

(58) Field of Classification Search ............... 348/135, 348/218.1, 207.1, 207.11; 358/450; 382/163
See application file for complete search history.

(56) References Cited

U.S. PATENT DOCUMENTS

| 5,528,290 | A * | 6/1996 | Saund | 348/218.1 |
| 6,904,183 | B2 * | 6/2005 | Slatter | 358/450 |
| 7,046,404 | B2 * | 5/2006 | Cheatle et al. | 358/450 |
| 2005/0165796 | A1 * | 7/2005 | Moore | 707/100 |
| 2005/0283989 | A1 | 12/2005 | Pettersson | |
| 2008/0030609 | A1 * | 2/2008 | Hasegawa | 348/333.01 |
| 2009/0103801 | A1 * | 4/2009 | Messler | 382/163 |

\* cited by examiner

*Primary Examiner*—Jason Whipkey
(74) *Attorney, Agent, or Firm*—Frank R. Niranjan

(57) ABSTRACT

A method for storing images of a workpiece is provided. The method includes the steps of: (a) reading an image of the workpiece from the storage; (b) reading one byte of the three bytes' color information of each pixel of the image; (c) storing one by one the read one byte of the three bytes' color information of each pixel of the image in an array allocated by the storage; (d) obtaining a coordinate value of a center point of the image from the location file; (e) storing the coordinate value of the center point of the image and the array representing the image's color information as an object in a source file; and (f) repeating the steps (a) to (e) till all the images of the workpiece are read. A related system is also disclosed.

7 Claims, 3 Drawing Sheets

| Image Name | X Coordinate Value | Y Coordinate Value |
|---|---|---|
| Image1 | 0014 | 0003 |
| Image2 | 0640 | 0000 |
| Image3 | 1280 | 0000 |
| Image4 | 1920 | 0000 |
| Image5 | 0000 | 0480 |
| Image6 | 0640 | 0480 |
| Image7 | 1280 | 0480 |
| Image8 | 1920 | 0480 |
| Image9 | 0000 | 0960 |
| Image10 | 0640 | 0960 |

FIG. 2

SYSTEM AND METHOD FOR STORING IMAGES OF A WORKPIECE

BACKGROUND OF THE INVENTION

1. Field of the Invention

The present invention generally relates to a system and method for storing images of a workpiece in a source file.

2. Description of Related Art

CCDs are used in a variety of different imaging devices, such as imagers, CCD cameras or scanners. The CCD is purely a light-sensitive integrated circuit that stores and displays data for an image of a workpiece in such a way that each pixel (picture element) in the image is converted into an electrical charge and the intensity of which is related to a color in the color spectrum. So, an optical lens is required to properly focus the incident radiation from the workpiece onto an array during a process of capturing the images of the workpiece.

The standard CCD can identify a pixel corresponding to the workpiece whose length is about 0.01 millimeter. If the resolution of a computer display is 1024*768 bytes, the image of the workpiece is only displayable up to 10 millimeter in its length. However, when there is a larger workpiece that needs to be measured on a measuring machine, the measuring engineer has to capture a series of images of the workpiece for measurement. However, the series of images occupy plenty of memory space.

What is needed, therefore, is a system and method for storing images of a workpiece in a source file with less memory space.

SUMMARY OF THE INVENTION

A system for storing images of a workpiece is provided. The system comprises a charged coupled device (CCD) configured for capturing a series of white and black images of a workpiece, and recording coordinate values of center points of the images; and a computer comprising:

an image retrieving card configured for retrieving the images and the recorded coordinate values of center points of the images from the CCD;

a storage for storing the coordinate values of center points of the images provided by the image retrieving card in a location file, and storing the images provided by the image retrieving card, each image comprising a plurality of pixels, each of which has three bytes of color information; and an image storing program configured for reading each image from the storage, reading one byte of the three bytes' color information of each pixel of the image, storing one by one the read one byte of the three bytes' color information of each pixel in an array allocated by the storage, obtaining a coordinate value of a center point of the image in the location file, and storing the coordinate value of center point of the image and the array representing the image's color information as an object in a source file in the storage.

A preferred method for storing images of a workpiece is also provided. The method includes the steps of: (a) providing a storage storing white and black images of the workpiece and a location file which includes coordinate values of center points of the images, each image comprising a plurality of pixels, each of which has three bytes of color information; (b) reading an image of the workpiece from the storage; (c) reading one byte of the three bytes' color information of each pixel of the image; (d) storing one by one the read one byte of the three bytes' color information of each pixel of the image in an array allocated by the storage; (e) obtaining a coordinate value of a center point of the image from the location file; (f) storing the coordinate value of the center point of the image and the array representing the image's color information as an object in a source file; and (g) repeating the steps from (b) to (f) till all the images of the workpiece are read.

Other advantages and novel features of the embodiments will be drawn from the following detailed description with reference to the attached drawings.

BRIEF DESCRIPTION OF THE DRAWINGS

FIG. 2 is a schematic diagram of a location file; and

DETAILED DESCRIPTION OF THE INVENTION

Figure 1:
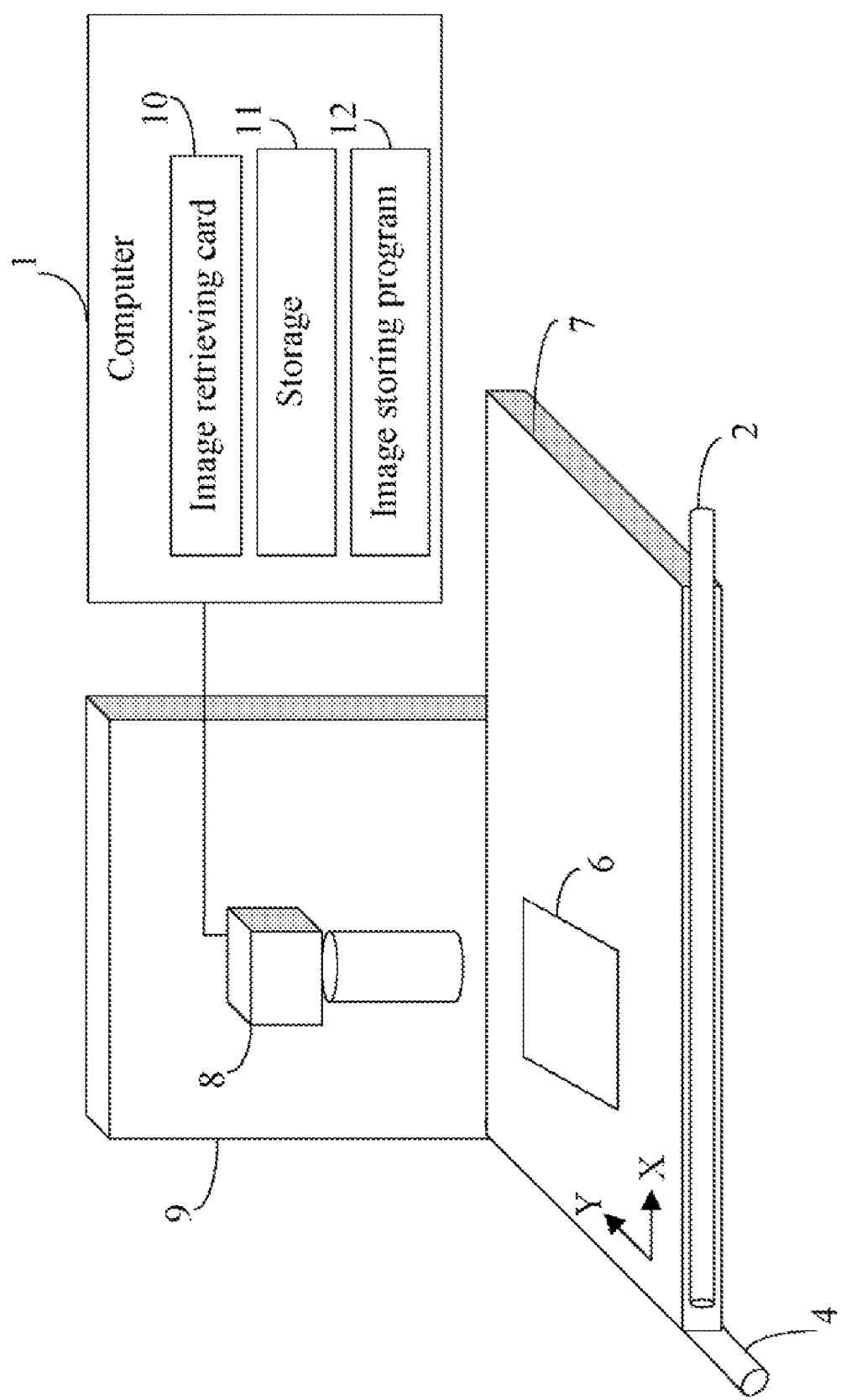
FIG. 1 is a schematic diagram of a system for storing images of a workpiece in accordance with the preferred embodiment.

FIG.1 is a schematic diagram of a system for storing images of a workpiece (hereinafter, "the system") in accordance with a preferred embodiment. The system includes a computer 1 and a workpiece 6 fixed at a platform 7 of a measuring machine 9. The computer 1 mainly includes an image retrieving card 10, a storage 11, and an image storing program 12. A charged coupled device (CCD) 8 fixed at a Z-axis of the measuring machine 9 captures a series of white and black images (hereinafter "images") of the workpiece 6, and records coordinate values of center points of the captured images, wherein the center points of the images represent the locations of the images. The CCD 8 includes an optical lens that focuses on the workpiece 6 for capturing the series of the images of different parts of the workpiece 6. Each image consists of many pixels and each pixel has three bytes of red-green-blue (RGB) color information. Among the bytes, one byte denotes a red color value, the other byte denotes a green color value and the last byte denotes a blue color value. The red color value, the green color value and the blue color value of the each pixel are equal.

The measuring machine 9 includes an X-axis manual rocker 2, a Y-axis manual rocker 4, and a Z-axis manual rocker (not shown). The X-axis manual rocker 2 may control the platform 7 to move in the direction of left and right. The Y-axis manual rocker 2 may control the platform 7 to move in the direction of back and forth. The workpiece 6 then moves along with the platform 7 controlled by the X-axis rocker 2 and the Y-axis rocker 4, in order for the CCD 8 to easily capture images of the workpiece 6 on the platform 7 by focusing on the workpiece 6.

The computer 1 is connected with the CCD 8 via a data line. The CCD 8 transmits all the images and the coordinate values of center points of the images to the image retrieving card 10 through the data line. Finally, the images and the coordinate values of center points of the images are transmitted from the image retrieving card 10 to the storage 11. The coordinate values of center points of the images are measured in dimension sizes. The coordinate values of center points of the images are stored in a location file 3 (as shown in FIG. 2) in the storage 11. Each image is stored as a bitmap (BMP) file. The BMP may be 8 bits, 16 bits, 24 bits or 32 bits.

The image storing program 12 is configured for reading each image from the storage 11, reading one byte of the three bytes' color information of each pixel of the image; storing one by one the read one byte of the three bytes' color information in an array allocated by the storage; obtaining a coordinate value of a center point of the image from the location file 3; storing the coordinate value of the center point of the image and the array representing image's color information as an object in a source file. The array is used for temporarily storing one byte of the three bytes' color information of each pixel of each image.

FIG. 2 is a schematic diagram of the location file. The location file 3 may include columns of: image name, X coordinate value and Y coordinate value. For example, the first image's name is "image1", whose coordinate value is (0014, 0003). X coordinate value of the image1 is "0014", and Y coordinate value of the image1 is "0003". The coordinate values of center points of the images are measured in dimension sizes, such as millimeter. The location file 3 only shows the coordinate values of center points of the images from 1~10, but not limited to the ten images.

Figure 3:
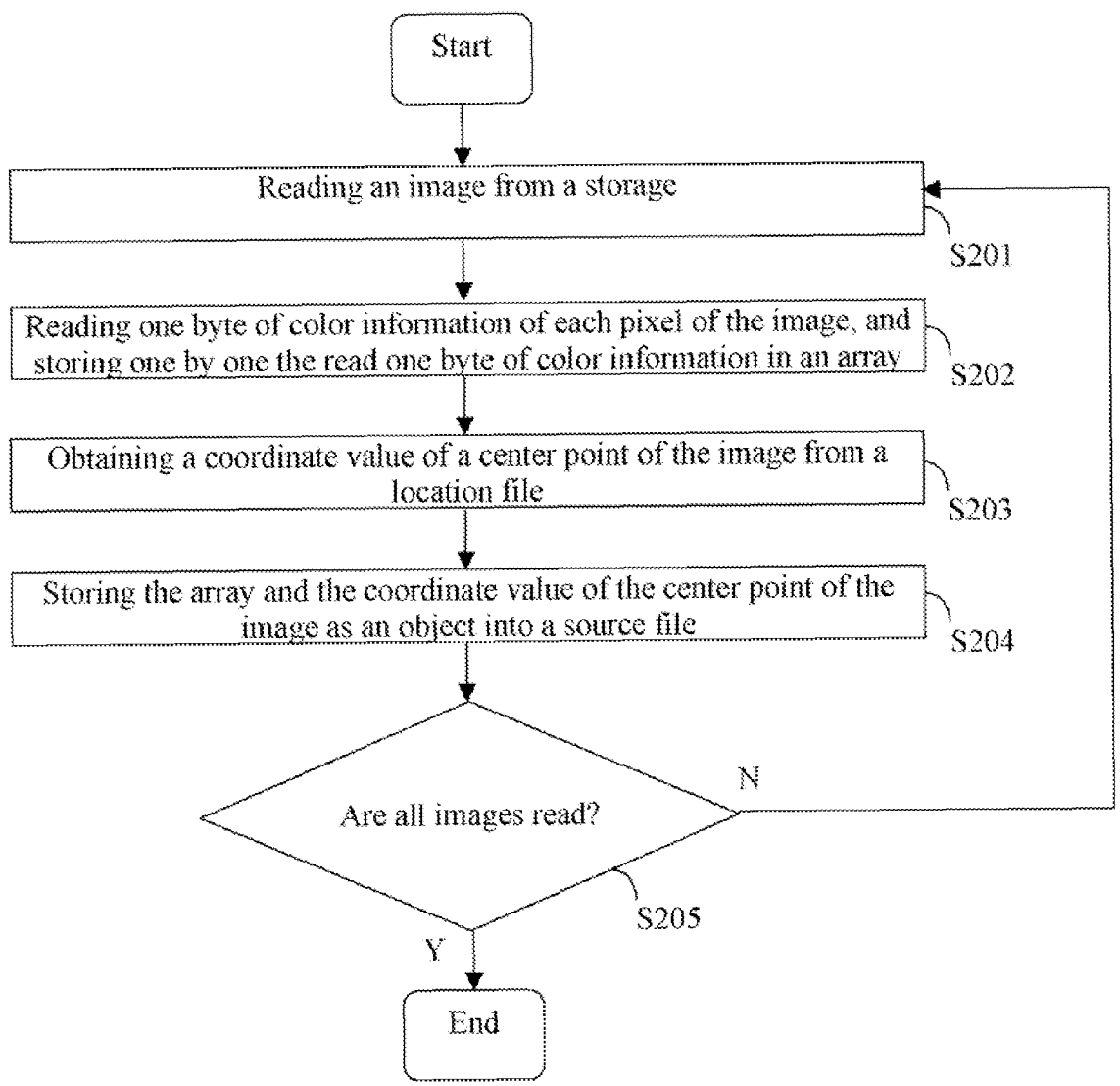
FIG. 3 is a flow chart of a preferred method for storing images of a workpiece by implementing the system of FIG. 1.

FIG. 3 is a flow chart of a preferred method of storing images of a workpiece by implementing the system of FIG. 1. In step S201, the image storing program 12 reads an image from the storage 11, such as image1. Each image is stored in the storage 11 as a bitmap (BMP) file. The BMP may be 8 bits, 16 bits, 24 bits or 32 bits. In the preferred embodiment, the images in the storage 11 are all white and black images. Each image consists of many pixels and each pixel has three bytes of red-green-blue (RGB) color information. For example, if each image is 1376 pixel wide and 1032 pixel high, then the image has 1376*1032=1420032 pixels. Each pixel has three bytes of color information. Then the image occupies about 1420032*3=4.16 Mbytes. Among the bytes, one byte denotes a red color value, the other byte denotes a green color value and the last byte denotes a blue color value. The red color value, the green color value and the blue color value of the each pixel are equal, which are between 0~255.

In step S202, the image storing program 12 reads one byte of the three bytes' color information of each pixel of the image1 from the storage 11, and storing one by one the read one byte of the three bytes' color information in an array allocated by the storage 11. The array is used for temporarily storing one byte of the three bytes' color information of each pixel of each image. In step S203, the image storing program 12 obtains a coordinate value of a center point of the image1 from the location file 3.

In step S204, the image storing program 12 stores the array representing the image1's color information and the coordinate value of the center point of the image1 as an object in a source file in the storage 11 of the computer 1. In step S205, the image storing program 12 determines whether all the images of the workpiece 6 are read. If all the images of the workpiece 6 are read, the procedure goes to end. Otherwise, the image storing program 12 reads a next image from storage 11, that is, the procedure returns to the step S201 described above.

The source file is a binary file, which includes at least an object. Numbers of the objects are determined by number of the images. For example, if the storage 11 stores 10 images, then the numbers of the objects are 10. The source file occupies space of the storage 11 only about 1420032*1*10=13.87 Mbytes. However, if the 10 images are stored in the storage 11, then the 10 images occupy space of the storage 11 about 1420032*3*10=41.6 Mbytes. Consequently, the preferred system and method reduces greatly the memory space of the storage 11 for storing the 10 images. Meanwhile, the 10 images are stored in a source file, thus the numbers of files is reduced from ten to one. So that the management of the files is more convenient.

It should be emphasized that the above-described embodiments, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure, and the present invention is protected by the following claims.

What is claimed is:

1. A computing system for storing images of a workpiece, the system comprising:
    a charged coupled device (CCD) configured for capturing a series of white and black images of a workpiece, and recording coordinate values of center points of the images; and
    a computer comprising:
    an image retrieving card configured for retrieving the images and the coordinate values of center points of the images from the CCD;
    a storage for storing the coordinate values of center points of the images provided by the image retrieving card in a location file, and storing the images provided by the image retrieving card, each image comprising a plurality of pixels, each of which has three bytes of color information;
    an image storing program configured for reading each image from the storage, reading one byte of the three bytes' color information of each pixel of the image, storing one by one the read one byte of the three bytes' color information of each pixel in an array allocated by the storage, obtaining a coordinate value of a center point of the image in the location file, and storing the coordinate value of center point of the image and the array representing the image's color information as an object in a source file in the storage; and
    a processor that executes the image storing program.

2. The system according to claim 1, wherein the CCD comprises an optical lens which focuses on the workpiece for capturing the images.

3. The system according to claim 1, wherein the image retrieving card is connected with the CCD via a data line.

4. The system according to claim 1, wherein the CCD is fixed at a measuring machine that comprises an X-axis manual rocker, a Y-axis manual rocker, and a Z-axis manual rocker.

5. An enabled-computerized method for storing images of a workpiece, the method being performed by execution of computer readable program code by at least one processor of at least one computer system, the method comprising the steps of:
    (a) providing a storage storing white and black images of the workpiece and a location file which includes coordinate values of center points of the images, each image comprising a plurality of pixels, each of which has three bytes of color information;
    (b) reading an image of the workpiece from the storage using the at least one processor;
    (c) reading one byte of the three bytes' color information of each pixel of the image using the at least one processor;
    (d) storing one by one the read one byte of the three bytes' color information of each pixel of the image in an array allocated by the storage using the at least one processor;
    (e) obtaining a coordinate value of a center point of the image from the location file using the at least one processor;

(f) storing the coordinate value of the center point of the image and the array representing the image's color information as an object in a source file using the at least one processor; and (g) repeating the steps from (b) to (f) till all the images of the workpiece are read.

6. The method according to claim 5, wherein the source file is a binary file which comprises at least one object.

7. The method according to claim 5, wherein the coordinate values of center points of the images are measured in dimension sizes.

* * * * *